United States Patent
Takano

(10) Patent No.: US 8,755,700 B2
(45) Date of Patent: Jun. 17, 2014

(54) IMAGE FORMING APPARATUS AND COMPUTER READABLE MEDIUM

(75) Inventor: Yukitoshi Takano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 343 days.

(21) Appl. No.: 13/117,415

(22) Filed: May 27, 2011

(65) Prior Publication Data

US 2012/0081715 A1 Apr. 5, 2012

(30) Foreign Application Priority Data

Oct. 1, 2010 (JP) ................................. 2010-223508

(51) Int. Cl.
*G03G 15/00* (2006.01)

(52) U.S. Cl.
USPC ............................................. 399/49; 399/301

(58) Field of Classification Search
USPC .................... 399/49, 301, 394, 396
See application file for complete search history.

(56) References Cited

U.S. PATENT DOCUMENTS 7,519,304 B2 * 4/2009 Namba ............................ 399/49
8,139,965 B2 * 3/2012 Freudenberg ................... 399/36

FOREIGN PATENT DOCUMENTS

JP 2003-136794 A 5/2003

* cited by examiner

*Primary Examiner* — Hoang Ngo
(74) *Attorney, Agent, or Firm* — Sughrue Mion, PLLC

(57) ABSTRACT

An image forming apparatus includes the following elements. A transport unit transports a medium on which plural marks are formed at predetermined intervals in the transport direction of the medium. An image forming unit forms an image on the medium. A reading unit is disposed to oppose positions at which the plural marks on the medium are formed so as to read the medium and to generate read information. A detecting unit detects the plural marks from the read information in accordance with predetermined times based on the predetermined intervals of the plural marks. A position adjusting unit adjusts the position of the image to be formed on the medium on the basis of a result of detecting the plural marks. A speed adjusting unit adjusts the transport speed of the medium on the basis of the read information.

19 Claims, 12 Drawing Sheets

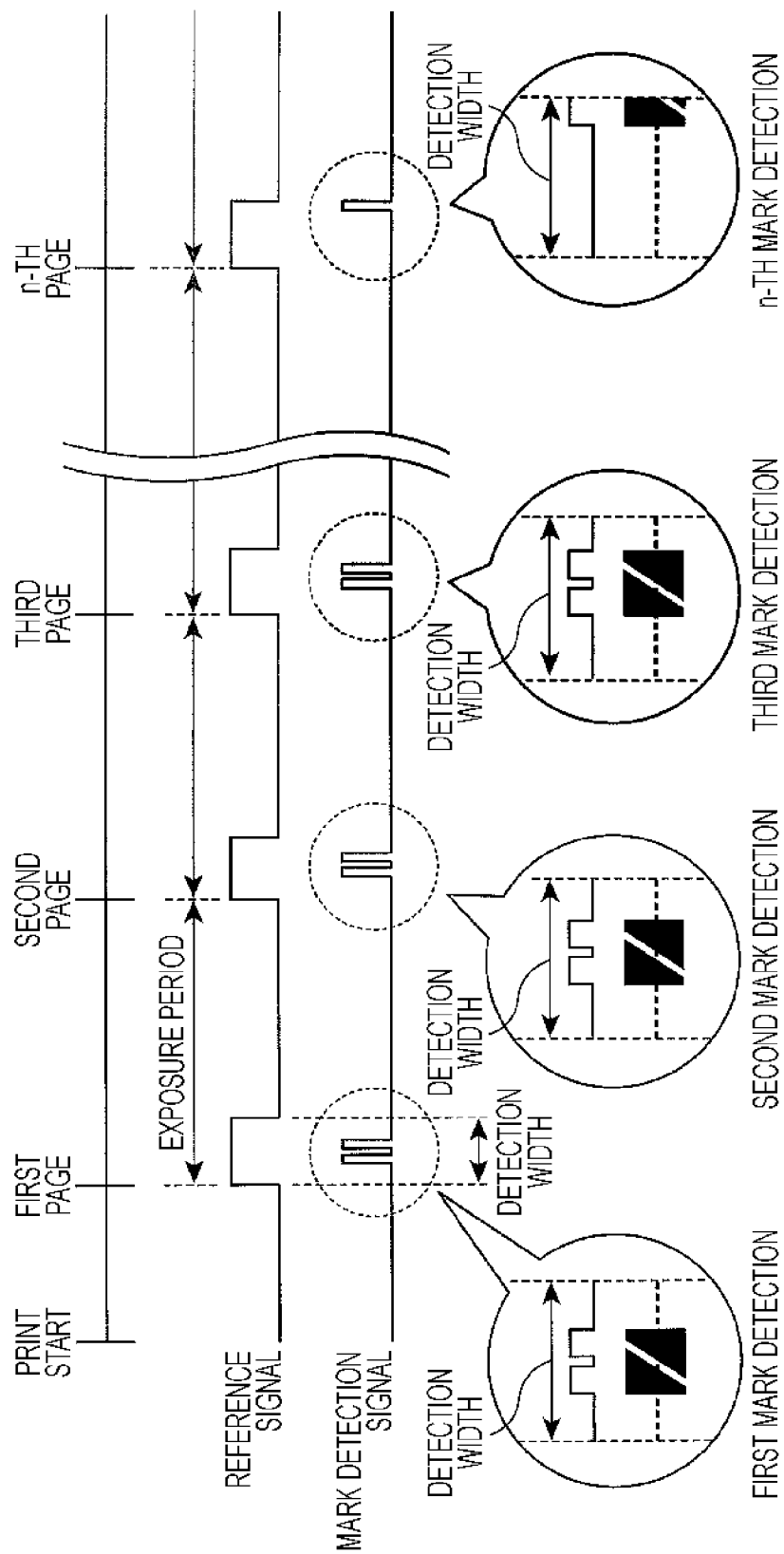

IMAGE FORMING APPARATUS AND COMPUTER READABLE MEDIUM

CROSS-REFERENCE TO RELATED APPLICATIONS

This application is based on and claims priority under 35 USC 119 from Japanese Patent Application No. 2010-223508 filed Oct. 1, 2010.

BACKGROUND

Technical Field

The present invention relates to image forming apparatuses and computer readable media.

SUMMARY

According to an aspect of the invention, there is provided an image forming apparatus including: a transport unit that transports a roll-like medium on which plural marks are formed at predetermined intervals in a transport direction of the roll-like medium; an image forming unit that forms an image on the medium transported by the transport unit; a reading unit that is disposed such that the reading unit opposes positions at which the plural marks on the medium are formed so as to read the medium and to generate read information; a detecting unit that detects the plural marks from the read information generated by the reading unit in accordance with predetermined times based on the predetermined intervals of the plural marks formed on the medium; a position adjusting unit that adjusts a position of the image to be formed on the medium using the image forming unit on the basis of a result of detecting the plural marks by the detecting unit; and a speed adjusting unit that adjusts a transport speed of the medium transported by the transport unit on the basis of the read information generated by the reading unit.

BRIEF DESCRIPTION OF THE DRAWINGS

Exemplary embodiments of the present invention will be described in detail based on the following figures, wherein:

FIG. 4 illustrates reading of marks formed on continuous paper;

DETAILED DESCRIPTION

Exemplary embodiments of the invention are described in detail below with reference to the accompanying drawings.

First Exemplary Embodiment

Figure 1:
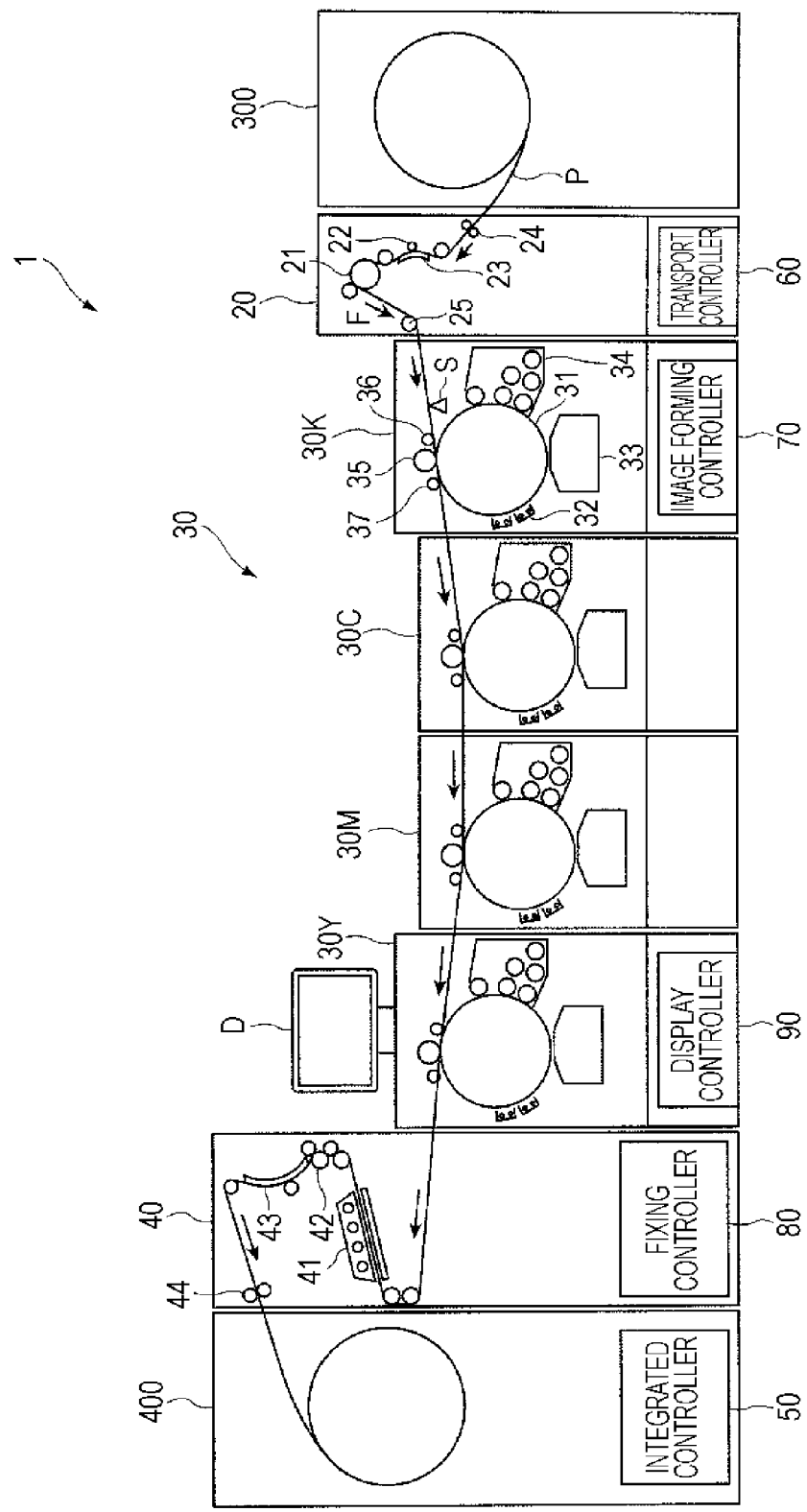
FIG. 1 illustrates the overall configuration of an image forming apparatus according to a first exemplary embodiment of the invention.

FIG. 1 illustrates the overall configuration of an image forming apparatus 1 according to a first exemplary embodiment of the invention.

As shown in FIG. 1, the image forming apparatus 1 of the first exemplary embodiment is a so-called continuous paper printer that forms images on continuous paper P, which is a roll-like medium. The image forming apparatus 1 is, for example, an electrophotographic-system image forming apparatus, and includes a continuous paper supply device 300, a sheet transport unit 20, an image forming device 30, a fixing unit 40, and a continuous paper take-up device 400 in the direction (indicated by arrow F in FIG. 1) in which the continuous paper P is transported from the upstream side to the downstream side. The continuous paper supply device 300 supplies the continuous paper P. The sheet transport unit 20 drives the transportation of the continuous paper P supplied from the continuous paper supply device 300. The image forming device 30 forms toner images of individual colors on the continuous paper P. The fixing unit 40 fixes toner images of individual colors formed on the continuous paper P. The continuous paper take-up device 400 takes up the continuous paper P on which images are formed. The image forming apparatus 1 also includes a display device D that displays images and receives instructions and inputs.

The sheet transport unit 20, which serves as an example of a transport unit, includes back tension rollers 24, an aligning roller 22, a main drive roller 21, and a sheet-transport-direction changing roller 25 from the upstream side to the downstream side in the transport direction of the continuous paper P.

The main drive roller 21 has a function to nip the continuous paper P with a predetermined pressure, and to feed the continuous paper P with a predetermined transport speed by being driven by a main motor (not shown) disposed in the sheet transport unit 20. The aligning roller 22 is disposed farther upstream than the main drive roller 21, and secures the transport path of the continuous paper P in cooperation with a partially cylindrical guide member 23. The back tension rollers 24 are disposed farther upstream than the main drive roller 21, and have a function to apply tension to the continuous paper P while rotating at a speed lower than the main drive roller 21. The sheet-transport-direction changing roller 25 is a driven roller which is driven by winding the continuous paper P thereon, and has a function to change the transport direction of the continuous paper P fed from the main drive roller 21 to the direction toward the image forming device 30.

The image forming device 30 includes a black (K) color image forming unit 30K for forming K color toner images on the continuous paper P, a cyan (C) color image forming unit 30C for forming C color toner images on the continuous paper P, a magenta (M) color image forming unit 30M for forming M color toner images on the continuous paper P, and a yellow (Y) color image forming unit 30Y for forming Y color images on the continuous paper P.

The K color image forming unit 30K, the C color image forming unit 30C, the M color image forming unit 30M, and the Y color image forming unit 30Y each include a photoconductor drum 31, a charging corotron 32 for charging the surface of the photoconductor drum 31 at a predetermined potential, an exposure device 33 for exposing the surface of the photoconductor drum 31 with light on the basis of image data, a developing device 34 for developing an electrostatic latent image formed on the surface of the photoconductor drum 31 by using a toner of a corresponding color, a transfer roller 35 for transferring a toner image formed on the surface of the photoconductor drum 31 onto the continuous paper P, and a pair of transfer guide rollers 36 and 37 respectively disposed on the upstream side and the downstream side of the transfer roller 35 so as to press the continuous paper P against the photoconductor drum 31.

The image forming apparatus 1 of this exemplary embodiment includes a mark detection sensor S provided on the transport path of the continuous paper P in the K color image forming unit 30K so as to detect marks M (see FIG. 2), which are examples of marks on the continuous paper P. The mark detection sensor S is disposed farther upstream in the transport direction of the continuous paper P than the transfer position formed by the transfer roller 35 and the photoconductor drum 31. The mark detection sensor S is disposed such that it opposes the positions at which the marks M are formed on the continuous paper P. The mark detection sensor S reads the continuous paper P under the control of an integrated controller 50, which is described later. As the mark detection sensor S of this exemplary embodiment, an optical sensor, such as a line charge coupled device (CCD) sensor, may be used.

The fixing unit 40 includes a flash fuser 41, a tension applying roller member 42, an aligning member 43, and tension rollers 44. The flash fuser 41 flash-fuses toner images of individual colors formed on the continuous paper P. The tension applying roller member 42 is disposed on the downstream side of the flash fuser 41 so as to apply tension to the continuous paper P. The aligning member 43 is disposed on the downstream side of the tension applying roller member 42 so as to adjust the path of the continuous paper P in the widthwise direction. The tension rollers 44 nip the continuous paper P at the exit so as to apply tension to the continuous paper P while rotating at a speed faster than the transport speed of the continuous paper P.

The display device D displays the operation state of the image forming apparatus 1, messages to a user, etc. The display device D also serves as an input unit for receiving instructions concerning the image forming operation from a user. As the display device D, a touch panel may be used.

The image forming apparatus 1 also includes the integrated controller 50 for integrally controlling the overall operation of the image forming apparatus 1, a transport controller 60 for controlling the sheet transport unit 20, an image forming controller 70 for controlling the operation of the image forming device 30, a fixing controller 80 for controlling the operation of the fixing unit 40, and a display controller 90 for controlling the display device D. In the image forming apparatus 1 of this exemplary embodiment, the integrated controller 50 integrally controls the transport controller 60, the image forming controller 70, the fixing controller 80, and the display controller 90.

The integrated controller 50, the transport controller 60, the image forming controller 70, the fixing controller 80, and the display controller 90 each include a central processing unit (CPU), a read only memory (ROM), and a random access memory (RAM). The CPU executes processing while exchanging data with the RAM in accordance with a program stored in the ROM, thereby implementing the corresponding functions.

Figure 2:
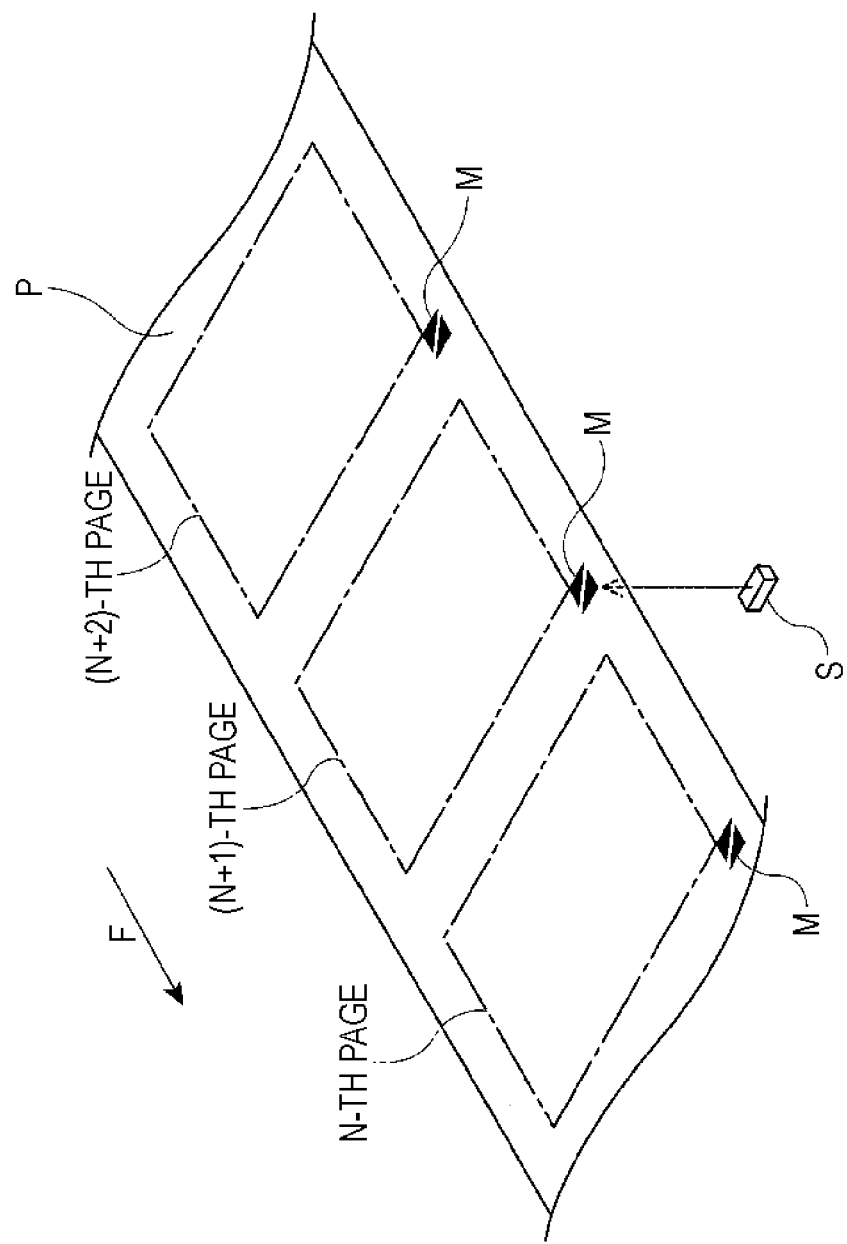
FIG. 2 illustrates marks formed on continuous paper.

FIG. 2 illustrates marks M on the continuous paper P.

On the continuous paper P of this exemplary embodiment, as shown in FIG. 2, plural marks M are formed side by side at predetermined intervals in the transport direction F. The marks M are used for positioning (registration adjustment) the continuous paper P when forming images on the continuous paper P. In this exemplary embodiment, the continuous paper P on which images are formed is divided into, for example, A4-size sheets. One mark M is formed for each region corresponding to an A4-size sheet (each region corresponding to one page in FIG. 2). The mark M is provided at the leading edge of each region corresponding to one page. Alternatively, plural marks M may be formed for each region corresponding to one page.

Figure 3A:
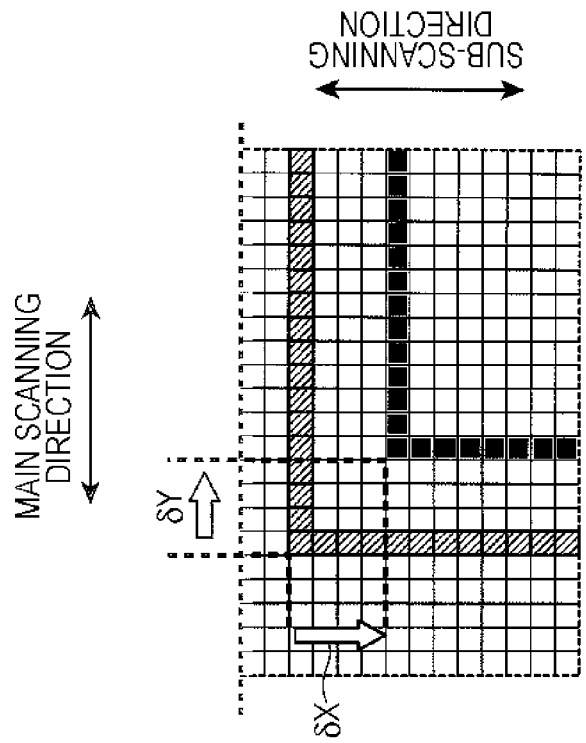
FIGS. 3A and 3B illustrate positional adjustments of an image based on a detection signal obtained as a result of detecting marks.
Figure 3B:
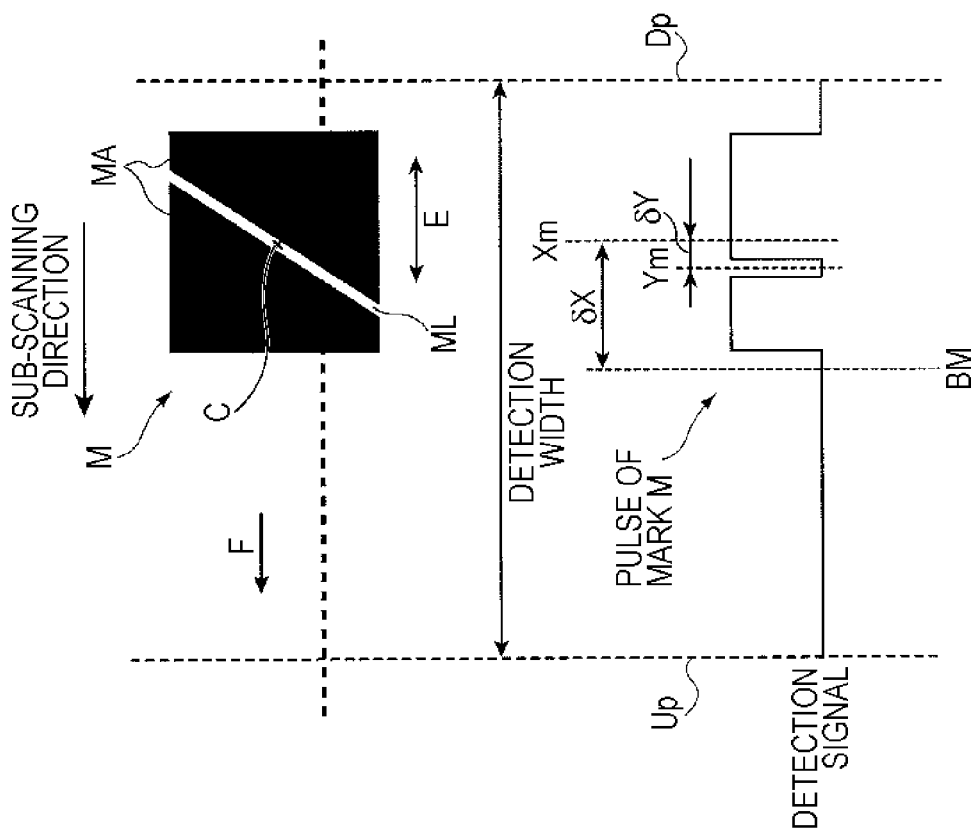

FIGS. 3A and 3B illustrate positional adjustments of an image based on a detection signal obtained as a result of detecting the marks M. More specifically, FIG. 3A is an enlarged view of a mark M and a diagram illustrating a pulse signal of the mark M. FIG. 3B is a conceptual drawing illustrating adjustments of a position at which an electrostatic latent image is to be written onto the photoconductor drum 31.

As shown in FIG. 3A, the mark M is a rectangular mark formed of a black color region MA and a white-color oblique line portion ML. In this embodiment, the longitudinal direction E of the mark M is aligned with the transport direction F of the continuous paper P. The white-color oblique line portion ML is inclined with respect to the transport direction F and crosses the black color region MA through the center C of the mark M.

The integrated controller 50 obtains a detection signal concerning the marks M read by the mark detection sensor S. As shown in FIG. 3A, the integrated controller 50 measures the distance between the rising edge and the falling edge of a pulse of the mark M obtained from the detection signal on the basis of a reference clock pulse. The integrated controller 50 also calculates an intermediate value that is half the distance between the rising edge and the falling edge of the pulse. The intermediate value of the pulse of the mark M obtained from the detection signal is referred to as the "mark intermediate value Xm".

The integrated controller 50 also calculates an intermediate value that is half the distance between the rising edge Up and the falling edge Dp of a unit pulse of a reference signal (see FIG. 4) corresponding to the read mark M. The intermediate value of the unit pulse of the reference signal is referred to as the "reference value BM".

The integrated controller 50 calculates a time difference $\delta X$ between the reference value BM and the mark intermediate value Xm. In this exemplary embodiment, the state in which the mark intermediate value Xm coincides with the reference value BM is a write reference time at which an electrostatic latent image to be formed on the photoconductor drum 31 is to be written. The integrated controller 50 then calculates a deviation from the write reference time on the basis of the time difference $\delta X$ between the reference value BM and the mark intermediate value Xm.

The integrated controller 50 also determines an intermediate value that is half the distance between the falling edge and the rising edge of the white-color oblique line portion ML of the mark M from the pulse of the mark M obtained from a detection signal. As shown in FIG. 3A, a recess portion formed at the center of the pulse of the mark M corresponds to the white-color oblique line portion ML. The integrated controller 50 calculates the distance between the falling edge and the rising edge of the recessed portion formed at the center of the pulse so as to determine the intermediate value of the distance. The intermediate value of the white-color oblique line portion ML is referred to as the "oblique line intermediate value Ym".

The integrated controller 50 then calculates a time difference $\delta Y$ between the mark intermediate value Xm and the oblique line intermediate value Ym from the pulse of the mark M obtained from a detection signal. In this exemplary embodiment, the state in which the mark intermediate value Xm coincides with the oblique line intermediate value Ym is a write reference position at which an electrostatic latent image to be formed on the photoconductor drum 31 is to be written in the main scanning direction. The integrated controller 50 calculates a deviation from the write reference position in the main scanning direction on the basis of the time difference $\delta Y$ between the mark intermediate value Xm and the oblique line intermediate value Ym.

The white-color oblique line portion ML crosses the center C of the mark M, as shown in FIG. 3A. Accordingly, when the center C of the mark M passes through the mark detection sensor S in alignment therewith in the main scanning direction, the mark intermediate value Xm and the oblique line intermediate value Ym coincide with each other, thereby generating no time difference $\delta Y$. On the other hand, when the center C of the mark M passes through the mark detection sensor S out of alignment therewith in the main scanning direction, the mark intermediate value Xm and the oblique line intermediate value Ym are displaced from each other, thereby generating a time difference $\delta Y$ therebetween. Since the angle of inclination of the white-color oblique line portion ML has been determined in advance, the deviation of the mark M in the main scanning direction from the mark detection sensor S can be determined on the basis of the time difference $\delta Y$.

As described above, the integrated controller 50 calculates, on the basis of the time differences $\delta X$ and $\delta Y$, an amount of correction for a write position at which an electrostatic latent image to be formed on the photoconductor drum 31 is to be written. Then, the integrated controller 50 sends information concerning the amount of correction for the write position to the image forming controller 70.

Then, as shown in FIG. 3B, an electrostatic latent image is written onto the photoconductor drum 31 at a time different from the write reference time by the time difference $\delta X$. The time difference from the write reference time is a deviation of an image to be formed on the continuous paper P in the sub-scanning direction. In this manner, in this exemplary embodiment, the write position of an image to be formed on the continuous paper P in the sub-scanning direction is adjusted in accordance with detection results of the mark M.

Also, as shown in FIG. 3B, an electrostatic latent image is written onto the photoconductor drum 31 at a position different from the write reference position in the main scanning direction by the time difference $\delta Y$. In this manner, in this exemplary embodiment, the write position of an image to be formed on the continuous paper P in the main scanning direction is adjusted in accordance with detection results of the mark M.

FIG. 4 illustrates reading of marks M formed on the continuous paper P.

In this exemplary embodiment, the mark detection sensor S reads marks M formed on the continuous paper P which sequentially pass through the mark detection sensor S. The integrated controller 50 detects marks M from a mark detection signal on the basis of a reference signal.

The reference signal is a signal which is output at a predetermined time on the basis of a reference clock pulse. As shown in FIG. 4, in the reference signal, a unit pulse for detecting one mark M is output at a predetermined period (at time intervals). The integrated controller 50 outputs, as a mark detection signal, a signal read from the mark detection sensor S whose mark pulses match the positions of the unit pulses of the reference signal. Additionally, in this exemplary embodiment, marks M are detected from the read signal at times specified by the reference signal. In this exemplary embodiment, the reference signal serves as an enable signal for detecting marks M. Accordingly, the times specified by the reference signal are times at which marks M are detected.

The period of the unit pulses is set in advance on the basis of the intervals of the marks M formed on the continuous paper P and the transport speed of the continuous paper P. In this exemplary embodiment, the period of the unit pulses is a theoretical value representing times at which the marks M pass through the mark detection sensor S, the theoretical value being calculated from the intervals of the marks M formed on the continuous paper P and the transport speed of the continuous paper P.

The pulse width (distance between the rising edge Up and the falling edge Dp, see FIG. 3A) of the unit pulse is set such that the entire mark M in the sub-scanning direction can be read. In this exemplary embodiment, as discussed above, a signal read from the mark detection sensor S whose mark pulses match the positions of the unit pulses of the reference signal is a mark detection signal. Accordingly, in this exemplary embodiment, as shown in FIG. 4, the pulse width of the unit pulse is referred to as the "detection width".

As described above, in this exemplary embodiment, the marks M formed on the continuous paper P are detected. Then, as discussed with reference to FIGS. 3A and 3B, positions of an image to be formed on the continuous paper P are adjusted on the basis of detection results of the marks M.

In this exemplary embodiment, the transport speed of the continuous paper P is also adjusted on the basis of a signal obtained as a result of reading marks M with the mark detection sensor S. The adjustments of the transport speed based on a signal concerning the marks M are discussed in detail later.

An image forming operation performed by the image forming apparatus 1 is described below.

Upon starting the image forming apparatus 1, image data is input into the integrated controller 50 via, for example, a communication network. Then, the integrated controller 50 separates the input image data into K color image data, C color image data, M color image data, and Y color image data, and sends the image data of the individual colors to the image forming controller 70.

In synchronization with the input of the image data into the integrated controller 50, the integrated controller 50 controls the sheet transport unit 20 through the use of the transport controller 60 and also controls the fixing unit 40 through the use of the fixing controller 80 to transport the continuous paper P at a predetermined transport speed while applying predetermined tension to the continuous paper P.

The integrated controller 50 reads marks M on the continuous paper P by using the mark detection sensor S. The integrated controller 50 controls the position at which writing of an image on the continuous paper P is started on the basis of the detection results of the marks M. More specifically, the integrated controller 50 generates, on the basis of the detection results of the marks M, information concerning corrections for a position at which an electrostatic latent image is to be written onto the photoconductor drum 31 using the exposure device 33, and sends such information to the image forming controller 70.

Under the control of the integrated controller 50, the image forming controller 70 controls the formation of toner images of individual colors in the K color image forming unit 30K, the C color image forming unit 30C, the M color image forming unit 30M, and the Y color image forming unit 30Y.

In the K color image forming unit 30K, the C color image forming unit 30C, the M color image forming unit 30M, and the Y color image forming unit 30Y, toner images of the corresponding colors are formed as follows. The photoconductor drums 31 start rotating, and the surfaces of the photoconductor drums 31 are charged to a potential (for example, −500 V) by the charging corotrons 32. Then, electrostatic latent images corresponding to the image data of the individual colors are formed by the exposure devices 33. Then, the electrostatic latent images formed on the photoconductor drums 31 are developed with toners of the individual colors by the developing devices 34 so as to form toner images. The toner images of the individual colors formed on the surfaces of the photoconductor drums 31 are transferred to the continuous paper P by the transfer rollers 35 and the transfer guide rollers 36 and 37. The continuous paper P sequentially passes through the K color image forming unit 30K, the C color image forming unit 30C, the M color image forming unit 30M, and the Y color image forming unit 30Y so as to superpose the K color toner image, the C color toner image, the M color toner image, and the Y color toner image on each other in this order, thereby forming full-color toner images on the continuous paper P.

Thereafter, the continuous paper P on which the full-color toner images are formed is transported into the fixing unit 40, and the toner images are fixed on the continuous paper P by the flash fuser 41. As a result, a full-color image is formed on the continuous paper P.

When transferring the continuous paper P, the times at which the marks M actually pass through the mark detection sensor S deviate from the correct times because of an error in the amount by which the continuous paper P is fed by the sheet transfer unit 20 and an error in the formation of the marks M on the continuous paper P (hereinafter errors concerning the transportation of the continuous paper P are generically referred to as "transport errors").

In this exemplary embodiment, the marks M are detected on the basis of the reference signal. The period of the unit pulses in the reference signal is set using the theoretical value based on the intervals of the marks M formed on the continuous paper P and the transport speed of the continuous paper P. Accordingly, because of transport errors, the times at which the marks M pass through the mark detection sensor S deviate from the reference times at which marks M should be detected, the reference times being set on the basis of the intervals of the marks M formed on the continuous paper P and the transport speed of the continuous paper P.

For example, as shown in FIG. 4, in the second detection results of the detection of the mark M formed on the second page, the position of the pulse of the mark M with respect to the detection width of the unit pulse deviates from that of the first detection result of the detection of the mark M formed on the first page.

In the case of an elongated medium, such as the continuous paper P, even if transport errors in each page are small, transport errors accumulated in the entire continuous paper P become large. For example, in FIG. 4, in the n-th detection results of the detection of the mark M formed on the n-th page, the position of the pulse of the mark M with respect to the detection width of the unit pulse considerably deviates from the correct time at which the mark M should be detected. In this manner, if the pulse waveform of the mark M is not entirely detected, it is difficult to adjust the write position of an image on the basis of the marks M.

Also, as described above, the marks M are detected on the basis of the reference signal, and the transport speed of the continuous paper P is adjusted by the use of the detected marks M. In this case, if marks M are not successfully detected, adjustments of the transport speed based on the marks M cannot be performed.

It may be possible to set the detection width of the unit pulse in the reference signal to be longer. However, the maximum detection width of the unit pulse is restricted. For example, as discussed with reference to FIG. 3B, in this exemplary embodiment, the position at which an image to be formed on the continuous paper P is to be written onto the photoconductor drum 31 is adjusted on the basis of the detection results of the marks M. Conversely, the position at which an image is to be written is not determined until the reading of the marks M has finished. Accordingly, the maximum detection width of the unit pulse in the reference signal is restricted.

Figure 5:
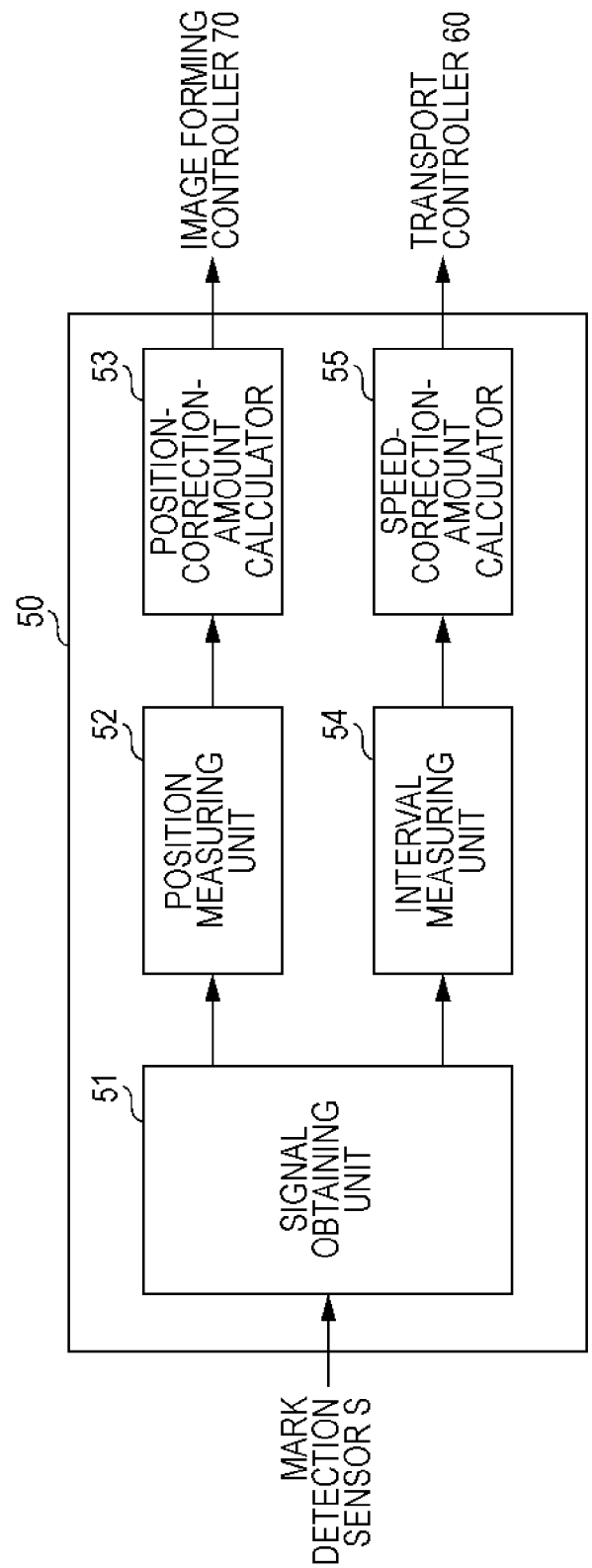
FIG. 5 is a functional block diagram illustrating a positional adjustment function and a speed adjustment function based on reading of marks.

FIG. 5 is a functional block diagram illustrating a positional adjustment function and a speed adjustment function based on the reading of marks M.

The integrated controller 50 of this exemplary embodiment includes, as shown in FIG. 5, a signal obtaining unit 51 for obtaining a read signal which is generated by reading the continuous paper P by using the mark detection sensor S, a position measuring unit 52 for measuring the positions of the marks M on the basis of the read signal obtained by the signal obtaining unit 51, and a position-correction-amount calculator 53 for calculating the amount of correction for the position at which an image is to be written on the basis of the positions of the marks M measured by the position measuring unit 52. The integrated controller 50 also includes an interval measuring unit 54 for measuring the time interval between the marks M (hereinafter referred to as the "mark interval") on the basis of the read signal obtained by the signal obtaining unit 51, and a speed-correction-amount calculator 55 for calculating the amount of correction for adjusting the transport speed of the continuous paper P on the basis of the mark interval obtained from the interval measuring unit 54.

The signal obtaining unit 51, which serves as an example of a reading unit, obtains a read signal, which serves as an example of read information, from the mark detection sensor S. The signal obtaining unit 51 stores the obtained read signal concerning the marks M. The signal obtaining unit 51 sends the read signal concerning the marks M to the position measuring unit 52 and the interval measuring unit 54.

The position measuring unit 52, which serves as an example of a detecting unit, generates a reference signal for detecting marks M. The position measuring unit 52 obtains a read signal from the signal obtaining unit 51. The position measuring unit 52 detects marks M from the read signal on the basis of the generated reference signal, and then outputs a mark detection signal. Then, as described with reference to FIGS. 3A and 3B, the position measuring unit 52 measures deviations of each mark M from the write reference time and the write reference position on the basis of the pulse of the mark M and the unit pulse of the reference signal. More specifically, the position measuring unit 52 measures the difference (time difference $\delta X$) between the reference value BM and the mark intermediate value Xm on the basis of the pulse of the mark M and the unit pulse of the reference signal. The position measuring unit 52 also measures the difference (time difference $\delta Y$) between the mark intermediate value Xm and the oblique line intermediate value Ym on the basis of the pulse of the mark M. The position measuring unit 52 sends information concerning the deviations of the mark M to the position-correction-amount calculator 53.

In this exemplary embodiment, the reference signal is generated in the position measuring unit 52. Alternatively, the position measuring unit 52 may obtain a reference signal generated in an external source.

The position-correction-amount calculator 53 calculates, on the basis of the information concerning the amount of deviations of the mark M obtained from the position measuring unit 52, the amounts of correction for the position at which an electrostatic latent image is to be formed on the photoconductor drum 31 using the exposure device 33. In this exemplary embodiment, the position-correction-amount calculator 53 calculates the amounts of correction for an image to be formed on the photoconductor drum 31 in the main scanning direction and in the sub-scanning direction. Then, the position-correction-amount calculator 53 sends information concerning the calculated amounts of correction to the image forming controller 70.

The interval measuring unit 54 obtains a read signal from the signal obtaining unit 51. The interval measuring unit 54 performs signal processing by using a read signal obtained from the signal obtaining unit 51. In this case, as shown in FIG. 5, the interval measuring unit 54 performs the signal processing using a channel different from the channel used by the position measuring unit 52. The interval measuring unit 54 measures the mark interval between two marks M from the obtained read signal. The interval measuring unit 54 of this exemplary embodiment measures, on the basis of the reference clock pulse, the time interval between the rising edge of the pulse of a mark M and the rising edge of the pulse of another mark M so as to calculate the mark interval between the two marks M. The mark interval may be calculated on the basis of the time interval between the center of the rising edge and the falling edge of the pulse of one mark M and the center of the rising edge and the falling edge of the pulse of another mark M.

In this exemplary embodiment, the interval measuring unit 54 sets a certain mark M as the first mark M, and skips the second through fifth marks M, and then, measures the interval between the first mark M and the sixth mark M. In this manner, in this exemplary embodiment, the interval measuring unit 54 selects two marks M from every group of plural marks M, and measures the mark interval between the selected two marks M. Although the mark interval between two adjacent marks M may be measured, the measurement precision of the mark interval is likely to be decreased because of the influence of errors of the size of the marks M. Thus, in this exemplary embodiment, the mark interval between two marks M which are spaced apart is measured by skipping plural marks M between the two marks M.

The speed-correction-amount calculator 55 calculates the amount of correction for the transport speed of the continuous paper P on the basis of the mark interval obtained from the interval measuring unit 54. The speed-correction-amount calculator 55 stores therein information concerning the interval of the marks M formed on the continuous paper P. This information has been input in advance when setting the continuous paper P in the continuous paper supply device 300. Then, the speed-correction-amount calculator 55 calculates the theoretical time interval of the marks M (hereinafter referred to as the "reference interval") based on the interval of the marks M formed on the continuous paper P and the transfer speed of the continuous paper P. The speed-correction-amount calculator 55 then calculates the time difference $\delta V$ between the theoretical reference interval and the mark interval measured by the interval measuring unit 54.

The reference interval is not restricted to the above-described information which has been input in advance. For example, the speed-correction-amount calculator 55 may calculate, during a certain period, the average of the intervals between the pulses of the marks M on the basis of the read signal obtained from the signal obtaining unit 51. Then, the speed-correction-amount calculator 55 may store the calculated average as the reference interval.

The speed-correction-amount calculator 55 calculates the amount of correction for the transport speed of the continuous paper P so as to decrease the time difference $\delta V$. In this exemplary embodiment, the continuous paper P is transported by using the main drive roller 21 in the sheet transport unit 20. Accordingly, the speed-correction-amount calculator 55 of this exemplary embodiment calculates the amount of correction for the transport speed of the continuous paper P fed by the main drive roller 21 on the basis of the time difference $\delta V$. Then, the speed-correction-amount calculator 55 sends information concerning the calculated amount of correction to the transport controller 60 so as to cause the transport controller 60 to control the main drive roller 21.

In the first exemplary embodiment, the position-correction-amount calculator 53 and the image forming controller 70 serve as a position adjusting unit. The interval measuring unit 54, the speed-correction-amount calculator 55, and the transport controller 60 serve as a speed adjusting unit.

Figure 6A:
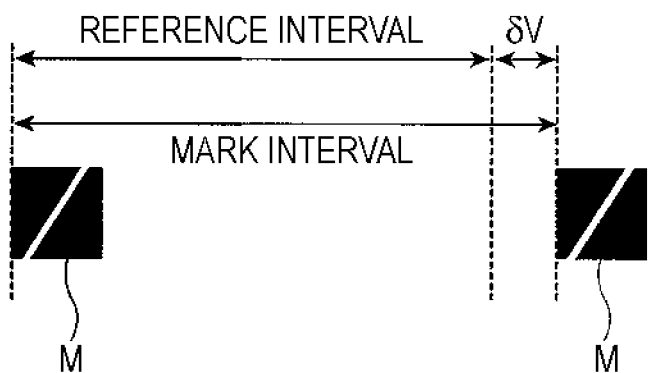
FIGS. 6A and 6B illustrate adjustments of the transport speed of continuous paper.
Figure 6B:
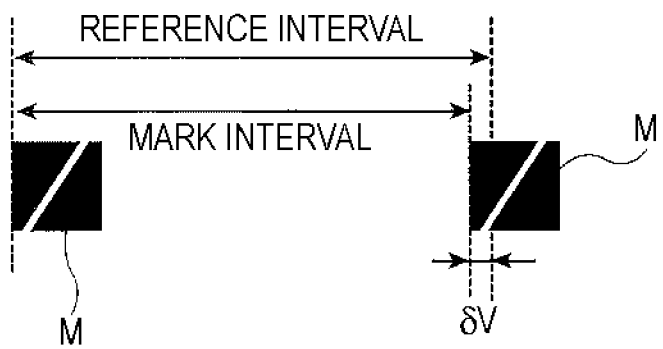

FIGS. 6A and 6B illustrate adjustments of the transport speed of the continuous paper P.

If the measured mark interval is longer than the reference interval, as shown in FIG. 6A, the time at which the marks M pass through the mark detection sensor S is later than the reference time. In this case, therefore, the speed-correction-amount calculator 55 calculates the amount of correction on the basis of the time difference $\delta V$ so as to increase the transport speed of the continuous paper P, and sends information concerning such an amount of correction to the transport controller 60. Then, the transport controller 60 temporarily increases the number of revolutions of the motor to drive the main drive roller 21 in accordance with the amount of correction based on the time difference $\delta V$.

On the other hand, if the measured mark interval is shorter than the reference interval, as shown in FIG. 6B, the time at which the marks M pass through the mark detection sensor S is earlier than the reference time. In this case, therefore, the speed-correction-amount calculator 55 calculates the amount of correction on the basis of the time difference $\delta V$ so as to decrease the transport speed of the continuous paper P, and sends information concerning such an amount of correction to the transport controller 60. Then, the transport controller 60 temporarily decreases the number of revolutions of the motor to drive the main drive roller 21 in accordance with the amount of correction based on the time difference $\delta V$.

Figure 7:
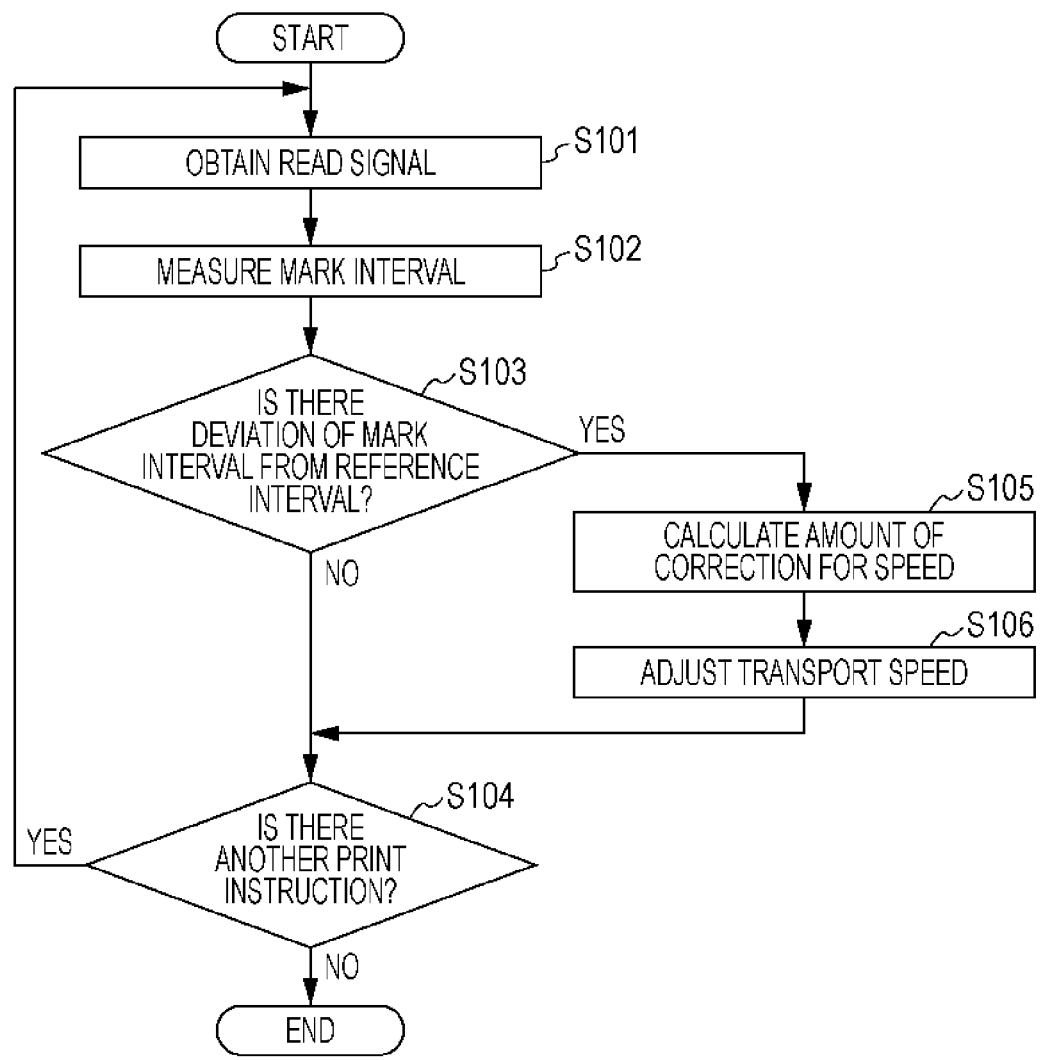
FIG. 7 is a flowchart illustrating a speed adjusting operation based on reading of marks.

FIG. 7 is a flowchart illustrating a speed adjusting operation based on reading of marks M.

Upon receiving an instruction to form images, the integrated controller 50 starts an image forming operation. Then, in step S101, the signal obtaining unit 51 obtains a read signal from the mark detection sensor S, and sends the read signal to the position measuring unit 52 and the interval measuring unit 54. Then, in step S102, upon receiving the read signal, the interval measuring unit 54 measures the mark interval, and sends information concerning the measured mark interval to the speed-correction-amount calculator 55.

The speed-correction-amount calculator 55 calculates the time difference $\delta V$ between the mark interval and the reference interval. It is then determined in step S103 whether the time difference $\delta V$ is equal to or greater than a threshold. If the result of step S103 is NO, i.e., if it is determined in step S103 that the time difference $\delta V$ is smaller than the threshold, it is determined that there is no deviation of the mark interval from the reference interval, and the process proceeds to step S104. If it is determined in step S103 that the time difference $\delta V$ is equal to or greater than the threshold, it is determined that there is a deviation of the mark interval from the reference interval. The process then proceeds to step S105. In this example, a threshold is used for the time difference $\delta V$ to determine whether adjustments of the transport speed are necessary. It is then determined in step S104 whether there is another print instruction. If the result of step S104 is YES, the process returns to step S101. If the result of step S104 is NO, the process is completed.

If it is determined in step S103 that there is a deviation of the mark interval from the reference interval, in step S105, the speed-correction-amount calculator 55 calculates the amount of correction for the transport speed on the basis of the time difference $\delta V$, and sends information concerning such an amount of correction to the transport controller 60. In step S106, the transport controller 60 corrects for the number of revolutions of the motor to drive the main drive roller 21 in accordance with the information received from the speed-correction-amount calculator 55 so as to adjust the transport speed of the continuous paper P. Then, the process proceeds to step S104 to determine whether there is another print instruction. If the outcome of step S104 is YES, the process returns to step S101. If the outcome of step S104 is NO, the process is completed.

Figure 8:
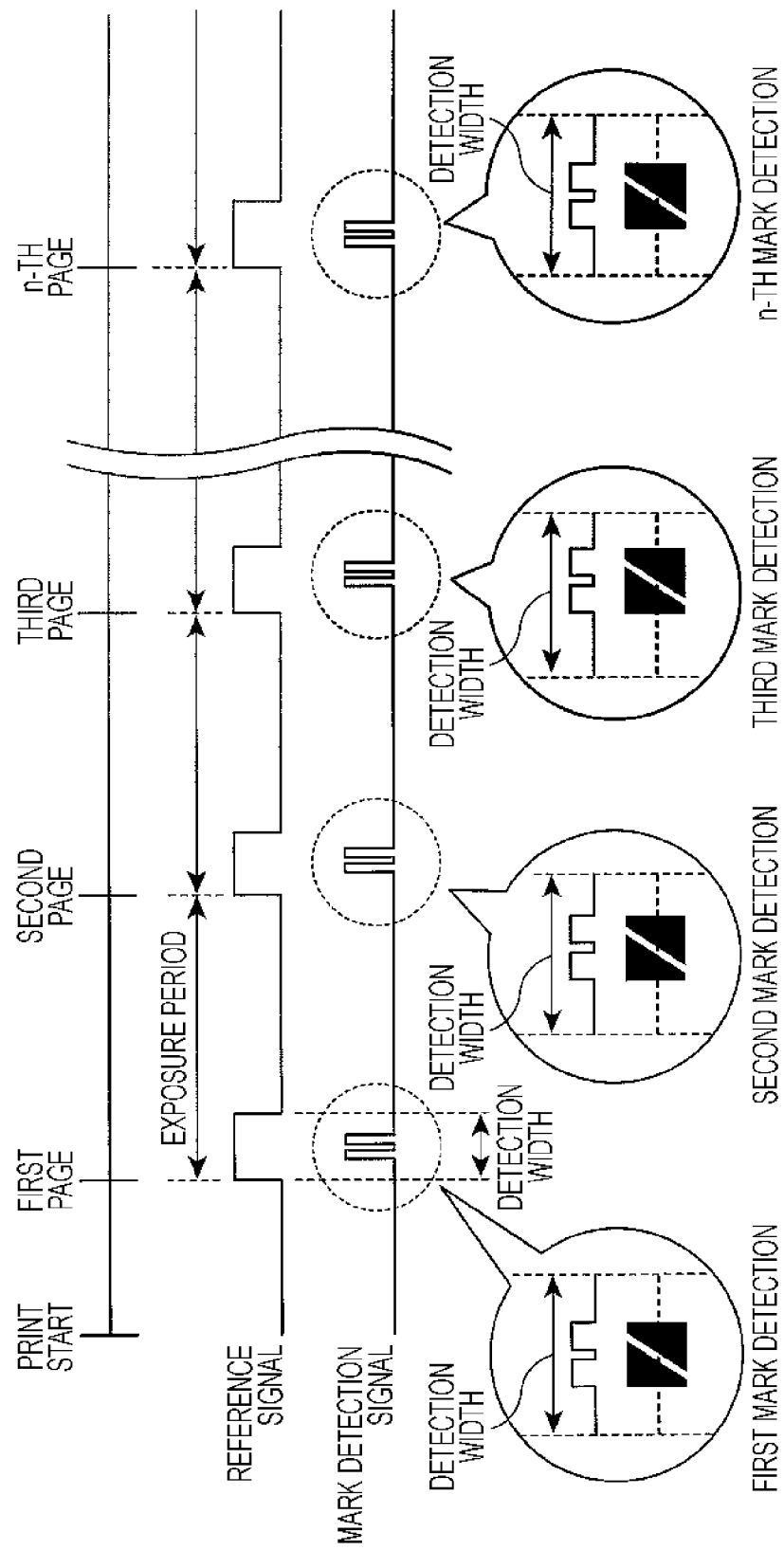
FIG. 8 illustrates the detection of marks after the transport speed has been adjusted.

FIG. 8 illustrates the detection of marks M after the transport speed has been adjusted.

As shown in FIG. 8, in the detection results of the first page through the third page in the mark detection signal, the position of the pulse of each mark M deviates from the detection width of the unit pulse because of the transport errors.

Then, after reading the mark M of the third page, the mark interval is measured by the interval measuring unit 54. Then, the speed-correction-amount calculator 55 calculates the amount of correction on the basis of the mark interval. As a result, a deviation of the time at which the marks M pass through the mark detection sensor S with respect to the period of the unit pulses of the reference signal has been canceled. In FIG. 8, by adjusting the transport speed, in the detection result of the mark M of the n-th page, the position of the pulse of the mark M in the read signal matches the unit pulse of the reference signal.

As described above, in this exemplary embodiment, the interval measuring unit 54 directly measures the mark interval from a read signal. That is, the interval measuring unit 54 performs signal processing using a channel different from the channel used by the position measuring unit 52 which detects marks M from the read signal.

When measuring the position of a mark M by the position measuring unit 52, there may be a case where the pulse of the mark M extends to outside the detection width of the unit pulse of the reference signal, which makes it difficult to detect the mark M.

In this exemplary embodiment, the correction for the write position of an image is made on the basis of the measuring results obtained from the position measuring unit 52. The correction for the transport speed is made on the basis of the measuring results obtained from the interval measuring unit 54. That is, the two types of corrections are independently made by using two different channels. Accordingly, even if the detection of marks has not been successfully performed by the position measuring unit 52, the interval measuring unit 54 independently measures the mark interval by directly obtaining a read signal from the signal obtaining unit 51 so as to adjust the transport speed. Then, the times (read times) at which the marks M pass through the mark detection sensor S are adjusted to the times specified by the unit pulse of the reference signal. As a result, the marks M are again ready to be detected by the position measuring unit 52.

Second Exemplary Embodiment

An image forming apparatus 1 according to a second exemplary embodiment is described below. The components having the configurations similar to those of the first embodiment are designated with like reference numerals, and a detailed explanation thereof is thus omitted.

Figure 9:
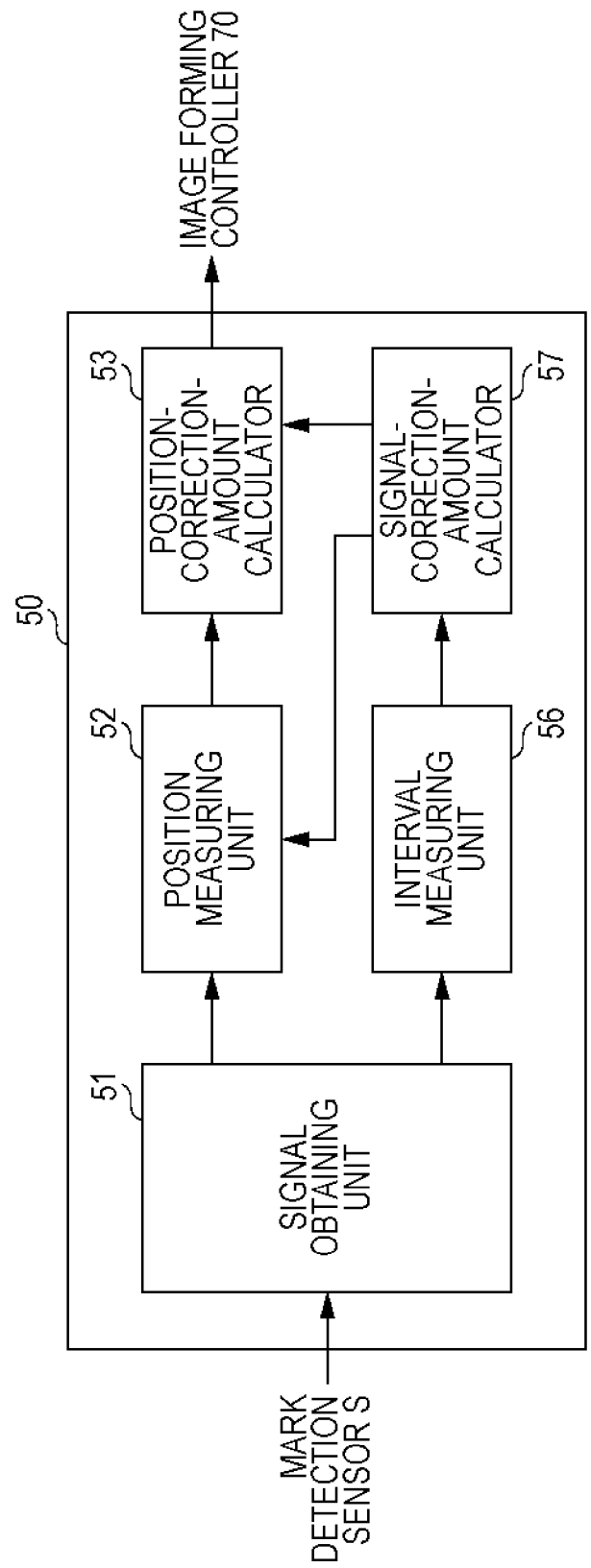
FIG. 9 is a functional block diagram illustrating a positional adjustment function and a reference-signal adjustment function based on reading of marks.

FIG. 9 is a functional block diagram illustrating a positional adjustment function and a reference-signal adjustment function based on the reading of marks M.

An integrated controller 50 of the second exemplary embodiment includes, as shown in FIG. 9, a signal obtaining unit 51, a position measuring unit 52, and a position-correction-amount calculator 53. The integrated controller 50 also includes an interval measuring unit 56 for measuring the mark interval on the basis of a read signal concerning the marks M obtained from the signal obtaining unit 51, and a signal-correction-amount calculator 57 for calculating a correction value for correcting a reference signal used in the position measuring unit 52 on the basis of the mark interval obtained from the interval measuring unit 56.

The signal obtaining unit 51 sends a read signal read from the mark detection sensor S to the position measuring unit 52 and the interval measuring unit 56.

The position measuring unit 52 measures the positions of the marks M on the basis of the mark detection results, and sends information concerning the positions of the marks M to the position-correction-amount calculator 53. Also, the position measuring unit 52 of the second exemplary embodiment is configured to adjust the reference signal on the basis of a correction value obtained from the signal-correction-amount calculator 57.

The position-correction-amount calculator 53 calculates the amount of correction for the position at which an electrostatic latent image is to be formed on the photoconductor drum 31 using the developing device 33. The position-correction-amount calculator 53 then sends information concerning the calculated amount of correction to the image forming controller 70.

The interval measuring unit 56 obtains a read signal from the signal obtaining unit 51. Then, the interval measuring unit 56 measures the mark interval between two marks M from the obtained read signal. The interval measuring unit 56 of the second exemplary embodiment measures the time interval between the rising edge of the pulse of one mark M and the rising edge of the pulse of another mark M on the basis of the reference clock pulse so as to calculate the mark interval between the two marks M.

The signal-correction-amount calculator 57 calculates a correction value for correcting the reference signal used in the position measuring unit 52 on the basis of the mark interval obtained from the interval measuring unit 56. The signal-correction-amount calculator 57 first calculates the time difference $\delta V$ between the reference interval, which is the theoretical time interval of the marks M, and the mark interval measured by the interval measuring unit 56. Then, the signal-correction-amount calculator 57 calculates, on the basis of the calculated time difference $\delta V$, the amount of correction for the position of the unit pulse of the reference signal generated in the position measuring unit 52. In the second exemplary embodiment, the position measuring unit 52 generates a reference signal on the basis of the reference clock pulse. Accordingly, the signal-correction-amount calculator 57 of the second exemplary embodiment calculates the number of clock pulses corresponding to the calculated time difference $\delta V$. Then, the signal-correction-amount calculator 57 sends information concerning the calculated number of clock pulses to the position measuring unit 52.

The position measuring unit 52 then corrects for the reference signal on the basis of the number of clock pulses, i.e., the correction value, obtained from the signal-correction-amount calculator 57.

When sending the information concerning the number of clock pulses to the position measuring unit 52, the signal-correction-amount calculator 57 also sends information concerning the time difference $\delta V$ obtained from the interval measuring unit 56 to the position-correction-amount calculator 53.

Figure 10A:
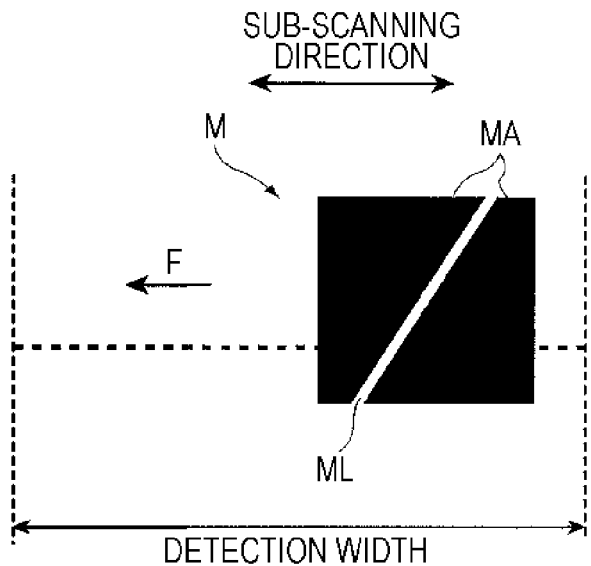
FIGS. 10A, 10B, and 10C illustrate processing performed by a position-correction-amount calculator for correcting a reference signal.
Figure 10B:
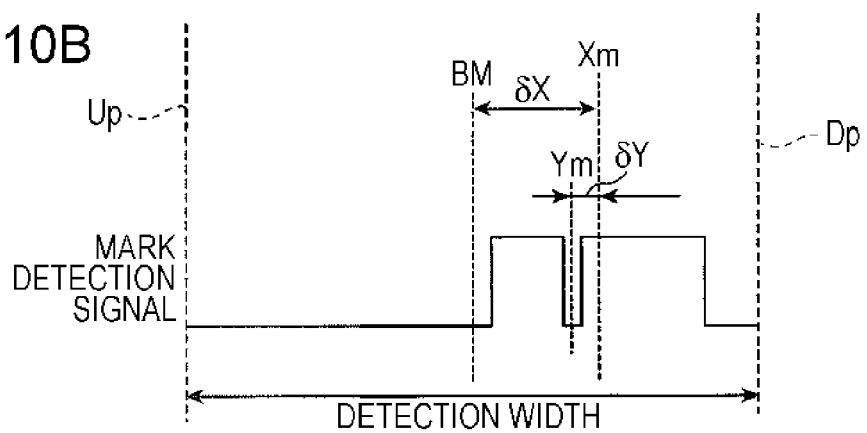
Figure 10C:
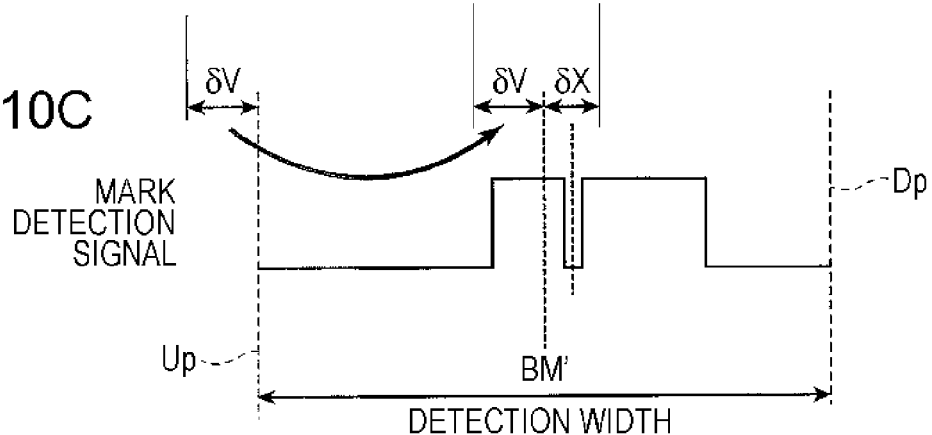

FIGS. 10A, 10B, and 10C illustrate processing performed by the position-correction-amount calculator 53 when a reference signal is corrected.

FIG. 10A illustrates a mark M; FIG. 10B illustrates the relationship between the unit pulse and the pulse of the mark M before the unit pulse is corrected; and FIG. 10C illustrates the relationship between the unit pulse and the pulse of the mark M after the unit pulse has been corrected.

As shown in FIG. 10B, the pulse of the mark M is displaced to the right with respect to the detection width of the unit pulse before the unit pulse is corrected. Then, as shown in FIG. 10C, the unit pulse is shifted in accordance with the time difference $\delta V$ calculated by the signal-correction-amount calculator 57. As a result, the pulse of the mark M is positioned at the center of the detection width of the unit pulse after the unit pulse has been corrected.

In the first exemplary embodiment, as discussed with reference to FIGS. 3A and 3B, the position-correction-amount calculator 53 adjusts the time at which an electrostatic latent image is to be formed on the photoconductor drum 31 on the basis of the reference value BM. Then, in the second exemplary embodiment, the unit pulse of the reference signal is shifted on the basis of the time difference $\delta V$ calculated by the signal-correction-amount calculator 57. In accordance with the shifting of the unit pulse, the position of the reference value BM is also shifted to the position of the reference value BM' shown in FIG. 10C.

Although the position of the unit pulse of the reference signal is shifted, the transport speed of the continuous paper P has not changed. Accordingly, as shown in FIGS. 10B and 10C, the pulse of the mark M in the mark detection signal is detected at the same position regardless of whether the unit pulse has been changed. Thus, if the position of the mark M is measured on the basis of the corrected reference value BM', the time at which an electrostatic latent image is to be formed on the photoconductor drum 31, which has been determined on the basis of the reference value BM before the unit pulse is corrected, deviates from the correct time.

Accordingly, in the second exemplary embodiment, when the reference signal has been corrected by using the signal-correction-amount calculator 57, the amount of correction for the unit pulse (time difference $\delta V$) calculated by the signal-correction-amount calculator 57 is reflected in the result of the position of the mark M measured by the position measuring unit 52. More specifically, the position-correction-amount calculator 53 adds the time difference $\delta V$ obtained from the interval measuring unit 56 to the time difference $\delta X$ obtained from the position measuring unit 52 ($\delta X + \delta V$), thereby calculating the amount of correction for the time at which the electrostatic latent image is to be formed on the photoconductor drum 31.

In the second exemplary embodiment, the interval measuring unit 56, the position-correction-amount calculator 53, the transport controller 60, the signal-correction-amount calculator 57, and the position measuring unit 52 serve as a time adjusting unit.

Figure 11:
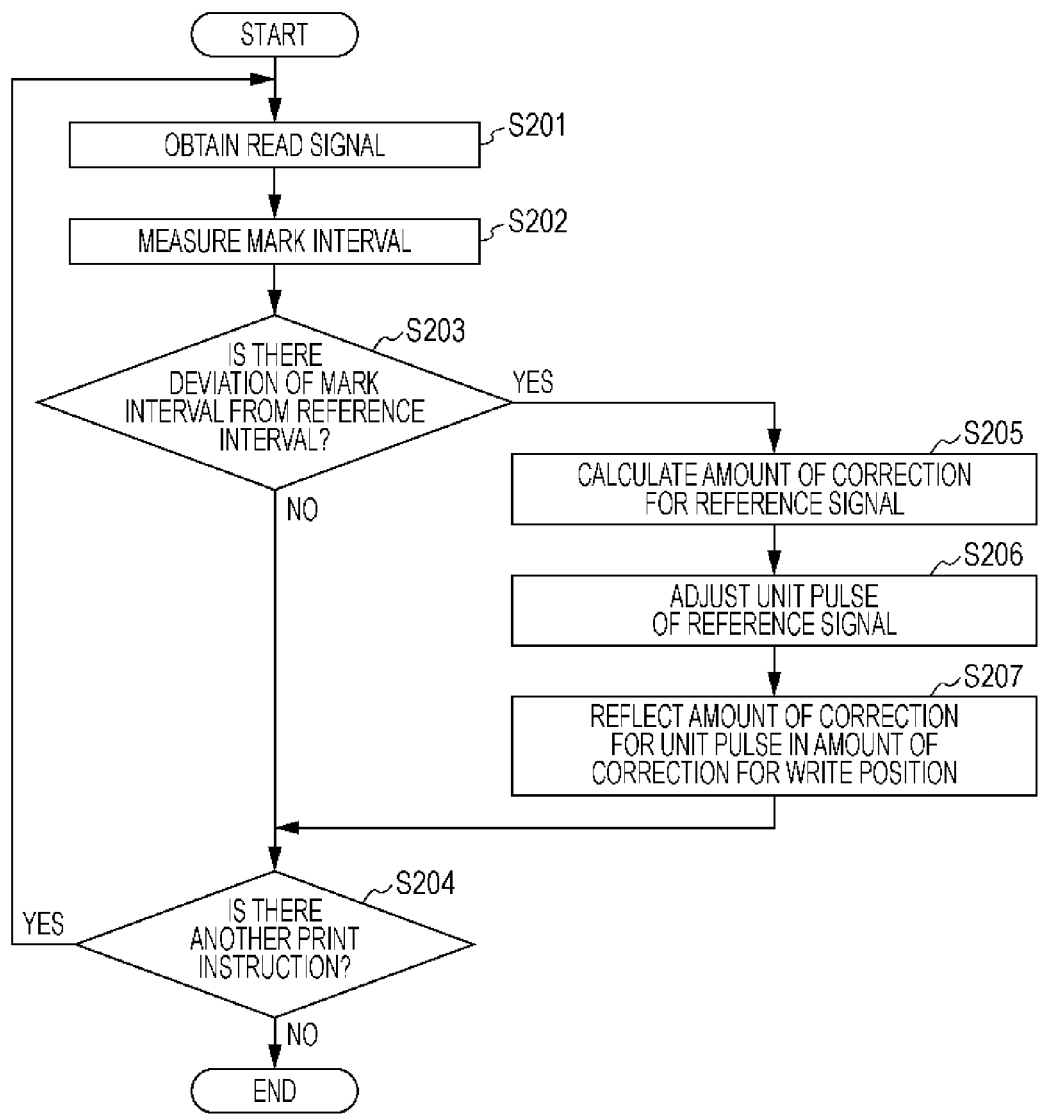
FIG. 11 is a flowchart illustrating a reference-signal adjusting operation on the basis of reading of marks.

FIG. 11 is a flowchart illustrating a reference-signal adjusting operation on the basis of the reading of marks M.

Upon receiving an instruction to form images, the integrated controller 50 starts an image forming operation. Then, in step S201, the signal obtaining unit 51 obtains a read signal from the mark detection sensor S, and sends the read signal to the position measuring unit 52 and the interval measuring unit 56. Then, in step S202, upon receiving the read signal, the interval measuring unit 56 measures the mark interval, and sends information concerning the measured mark interval to the signal-correction-amount calculator 57 and the position-correction-amount calculator 53.

The signal-correction-amount calculator 57 calculates the time difference $\delta V$ between the mark interval and the reference interval. It is then determined in step S203 whether the time difference $\delta V$ is equal to or greater than a threshold. If the result of step S203 is NO, i.e., if it is determined in step S203 that the time difference $\delta V$ is smaller than the threshold, it is determined that there is no deviation of the mark interval from the reference interval, and the process proceeds to step S204. If it is determined in step S203 that the time difference $\delta V$ is equal to or greater than the threshold, it is determined that there is a deviation of the mark interval from the reference interval. The process then proceeds to step S205. In this example, a threshold is used for the time difference $\delta V$ to determine whether adjustments of the reference signal are necessary.

It is then determined in step S204 whether there is another print instruction. If the result of step S204 is YES, the process returns to step S201. If the result of step S204 is NO, the process is completed.

If it is determined in step S203 that there is a deviation of the mark interval from the reference interval, in step S205, the signal-correction-amount calculator 57 calculates the amount of correction for correcting the unit pulse of the reference signal on the basis of the time difference $\delta V$, and sends information concerning such an amount of correction to the position measuring unit 52. In step S206, the position measuring unit 52 changes the position of the unit pulse of the reference signal on the basis of the obtained amount of correction. In step S207, the position-correction-amount calculator 53 reflects the amount of correction obtained from the signal-correction-amount calculator 57 in the amount of correction based on the position of the mark M. Then, the process proceeds to step S204 to determine whether there is another print instruction. If the outcome of step S204 is YES, the process returns to step S201. If the outcome of step S204 is NO, the process is completed.

Figure 12:
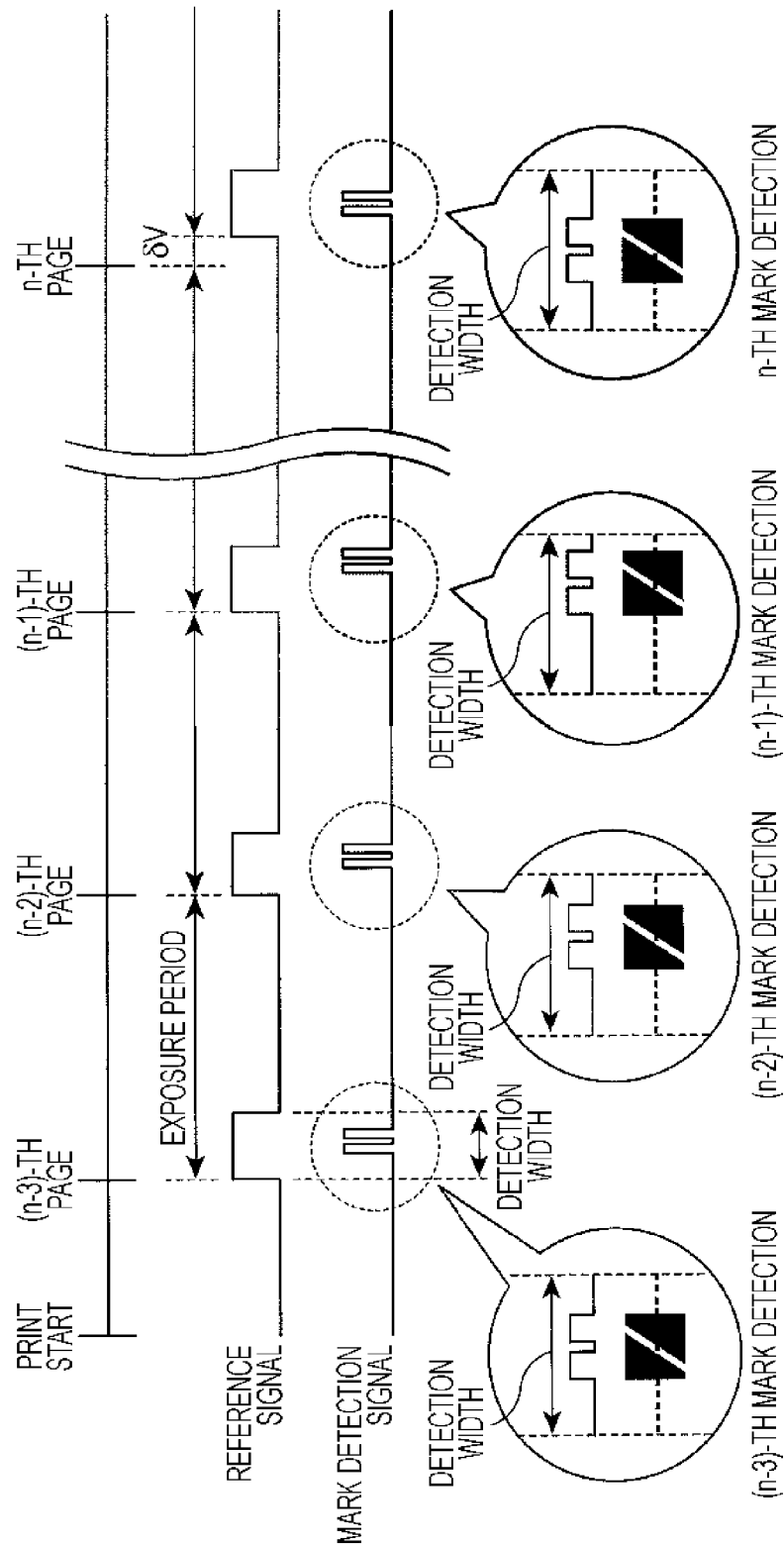
FIG. 12 illustrates reading of marks after a reference signal has been adjusted.

FIG. 12 illustrates reading of marks M after the reference signal has been adjusted.

As shown in FIG. 12, in the detection results of the (n−3)-th page through the (n−1)-th page in the mark detection signal, the position of the pulse of each mark M deviates from the detection width of the unit pulse because of transport errors.

Then, after reading the mark M of the (n−1)-th page, the interval measuring unit 56 measures the mark interval. The signal-correction-amount calculator 57 then calculates the amount of correction for adjusting the reference signal on the basis of the mark interval, and then sends information concerning the amount of correction to the position measuring unit 52. Then, the position measuring unit 52 changes the position of the unit pulse of the reference signal on the basis of the obtained amount of correction. As a result, as shown in FIG. 12, the unit pulse of the reference signal for reading the mark M of the n-th page is shifted by the time difference $\delta V$ calculated from the measured mark interval.

As a result, a deviation of the times at which the marks M pass through the mark detection sensor S with respect to the period of the unit pulses of the reference signal, which has been caused by transport errors, has been canceled. In FIG. 12, in the detection result of the mark M of the n-th page, the unit pulse of the reference signal matches the position of the pulse of the mark M in the read signal. Thus, when detecting marks M on the basis of the reference signal, marks M can be detected from the read signal concerning the marks M.

As described above, in the image forming apparatus 1 of the second exemplary embodiment, by adjusting the reference signal, the positions of the unit pulses of the reference signal are allowed to match the times at which the marks M pass through the mark detection sensor S (i.e., the times at which the mark detection sensor S reads the marks M).

In order to allow the positions of the unit pulses of the reference signal to match the positions of the pulses of the marks M in the signal read by the mark detection sensor S, in the first exemplary embodiment, the transport speed is adjusted, and the second exemplary embodiment, the unit pulse of the reference signal is adjusted. However, both the transport speed and the reference signal may be adjusted. In this case, the ratio of the adjustment of the reference signal to the adjustment of the transport speed may be varied in terms of frequency. For example, if the transport speed is adjusted ten times, the reference signal may be adjusted one time. Also, the ratio of the adjustment of the reference signal to the adjustment of the transport speed may be varied in terms of the type of adjustment. For example, rough adjustments may be performed by adjusting the transport speed, and fine adjustments may be performed by adjusting the reference signal.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a transport unit that transports a roll-like medium on which a plurality of marks are formed at predetermined intervals in a transport direction of the roll-like medium;
an image forming unit that forms an image on the medium transported by the transport unit;
a reading unit that is disposed such that the reading unit opposes positions at which the plurality of marks on the medium are formed so as to read the medium and to generate read information;
a detecting unit that detects the plurality of marks from the read information generated by the reading unit in accordance with predetermined times based on the predetermined intervals of the plurality of marks formed on the medium;
a position adjusting unit that adjusts a position of the image to be formed on the medium using the image forming unit on the basis of a result of detecting the plurality of marks by the detecting unit; and
a speed adjusting unit that adjusts a transport speed of the medium transported by the transport unit on the basis of the read information generated by the reading unit,
wherein each of the plurality of marks comprise a rectangular mark formed of a black color region and a white-color oblique line portion in the black color region.

2. The image forming apparatus according to claim 1, wherein the speed adjusting unit adjusts the transport speed of the medium on the basis of an interval between pulses of the marks contained in a read signal of the read information.

3. The image forming apparatus according to claim 2, wherein the speed adjusting unit adjusts the transport speed of the medium so as to decrease a difference between the predetermined interval of the plurality of marks and the interval between the pulses of the marks contained in the read signal of the read information.

4. The image forming apparatus according to claim 1, wherein the speed adjusting unit adjusts the transport speed of the medium so as to decrease a difference between the predetermined interval of the plurality of marks and an interval between pulses of the marks contained in a read signal of the read information.

5. The image forming apparatus according to claim 1, wherein the white-color oblique line portion is inclined with respect to the transport direction.

6. An image forming apparatus comprising:
a transport unit that transports a roll-like medium on which a plurality of marks are formed at predetermined intervals in a transport direction of the roll-like medium;
an image forming unit that forms an image on the medium transported by the transport unit;
a reading unit that is disposed such that the reading unit opposes positions at which the plurality of marks on the medium are formed so as to read the medium and to generate a read signal;
a detecting unit that obtains a reference signal which specifies times at which the plurality of marks are detected and that detects the plurality of marks from the read signal generated by the reading unit at the times specified by the reference signal;
a position adjusting unit that adjusts a position of the image to be formed on the medium using the image forming unit on the basis of a result of detecting the plurality of marks by the detecting unit; and
a time adjusting unit that makes adjustments so that positions of the plurality of marks contained in the read signal match the times specified by the reference signal,
wherein each of the plurality of marks comprise a rectangular mark formed of a black color region and a white-color oblique line portion in the black color region.

7. The image forming apparatus according to claim 6, wherein the time adjusting unit corrects the reference signal in accordance with the positions of the plurality of marks contained in the read signal.

8. The image forming apparatus according to claim 7, wherein the position adjusting unit reflects an amount of correction for the reference signal adjusted by the time adjusting unit in an amount of correction for the position of the image adjusted by the position adjusting unit.

9. The image forming apparatus according to claim 7, wherein the time adjusting unit adjusts a transport speed of the medium transported by the transport unit so as to change the positions of the plurality of marks contained in the read signal.

10. The image forming apparatus according to claim 8, wherein the time adjusting unit adjusts a transport speed of the medium transported by the transport unit so as to change the positions of the plurality of marks contained in the read signal.

11. The image forming apparatus according to claim 6, wherein the time adjusting unit corrects the reference signal in accordance with the positions of the plurality of marks contained in the read signal, and reflects an amount of correction for the reference signal adjusted by the time adjusting unit in an amount of correction for the position of the image adjusted by the position adjusting unit.

12. The image forming apparatus according to claim 11, wherein the time adjusting unit adjusts a transport speed of the medium transported by the transport unit so as to change the positions of the plurality of marks contained in the read signal.

13. The image forming apparatus according to claim 6, wherein the time adjusting unit adjusts a transport speed of the medium transported by the transport unit so as to change the positions of the plurality of marks contained in the read signal.

14. The image forming apparatus according to claim 6, wherein the white-color oblique line portion is inclined with respect to the transport direction.

15. A non-transitory computer readable medium storing a program causing a computer to execute a process, the process comprising:
  transporting a roll-like medium on which a plurality of marks are formed at predetermined intervals in a transport direction of the roll-like medium;
  forming an image on the medium which is being transported;
  reading the medium and generating read information;
  detecting the plurality of marks from the read information in accordance with predetermined times based on the predetermined intervals of the plurality of marks formed on the medium;
  adjusting a position of the image to be formed on the medium on the basis of a result of detecting the plurality of marks; and
  adjusting a transport speed of the medium on the basis of the read information,
  wherein each of the plurality of marks comprise a rectangular mark formed of a black color region and a white-color oblique line portion in the black color region.

16. The non--transitory computer readable medium according to claim 15, wherein the white-color oblique line portion is inclined with respect to the transport direction.

17. A non-transitory computer readable medium storing a program causing a computer to execute a process, the process comprising:
  transporting a roll-like medium on which a plurality of marks are formed at predetermined intervals in a transport direction of the roll-like medium;
  forming an image on the medium which is being transported;
  reading the medium and generating a read signal;
  obtaining a reference signal which specifies times at which the plurality of marks are detected and detecting the plurality of marks from the read signal at the times specified by the reference signal;
  adjusting a position of the image to be formed on the medium on the basis of a result of detecting the plurality of marks; and
  making adjustments so that positions of the plurality of marks contained in the read signal match the times specified by the reference signal,
  wherein each of the plurality of marks comprise a rectangular mark formed of a black color region and a white-color oblique line portion in the black color region.

18. The non-transitory computer readable medium according to claim 17, wherein the white-color oblique line portion is inclined with respect to the transport direction.

19. An image forming apparatus comprising:
  a transport unit that transports a roll-like medium on which a plurality of marks are formed at predetermined intervals in a transport direction of the roll-like medium;
  an image forming unit that forms an image on the medium transported by the transport unit by transferring the image from a latent image formed on a photoconductor drum;
  a reading unit that is disposed such that the reading unit opposes positions at which the plurality of marks on the medium are formed so as to read the medium and to generate read information;
  a detecting unit that detects the plurality of marks from the read information generated by the reading unit in accordance with predetermined times based on the predetermined intervals of the plurality of marks formed on the medium;
  a position adjusting unit that adjusts a position of the image to be formed on the medium by adjusting a position at which the latent image is formed on the photoconductor drum on the basis of a result of detecting the plurality of marks by the detecting unit; and
  a speed adjusting unit that adjusts a transport speed of the medium transported by the transport unit on the basis of the read information generated by the reading unit,
  wherein each of the plurality of marks comprise a rectangular mark formed of a black color region and a white-color oblique line portion in the black color region.

* * * * *